(12) United States Patent
Tsai

(10) Patent No.: US 12,737,888 B2
(45) Date of Patent: Sep. 15, 2026

(54) DATA PROCESSING METHOD AND DEVICE

(71) Applicant: Acer Medical Inc., New Taipei City (TW)

(72) Inventor: Chin-Han Tsai, New Taipei City (TW)

(73) Assignee: ACER MEDICAL INC., New Taipei City (TW)

( * ) Notice: Subject to any disclaimer, the term of this patent is extended or adjusted under 35 U.S.C. 154(b) by 248 days.

(21) Appl. No.: 18/644,433

(22) Filed: Apr. 24, 2024

(65) Prior Publication Data

US 2025/0182282 A1 Jun. 5, 2025

(30) Foreign Application Priority Data

Dec. 1, 2023 (TW) ................................ 112146782

(51) Int. Cl.
*G06T 7/00* (2017.01)

(52) U.S. Cl.
CPC .. *G06T 7/0014* (2013.01); *G06T 2207/30008* (2013.01)

(58) Field of Classification Search
CPC ......... G06T 7/0012; G06T 2207/30008; G06T 2207/10116; G06T 2210/41; G16H 30/20;
(Continued)

(56) References Cited

U.S. PATENT DOCUMENTS 6,132,373 A * 10/2000 Ito ......................... G06T 7/0012 600/437
9,265,472 B2 2/2016 Kalvesten et al.
(Continued)

FOREIGN PATENT DOCUMENTS

CN 103577699 A 2/2014
CN 110491479 A 11/2019
(Continued)

OTHER PUBLICATIONS

Chinese language office action dated Aug. 30, 2024, issued in application No. TW 112146782.
(Continued)

*Primary Examiner* — Gregory A Morse
*Assistant Examiner* — Stefano Anthony Dardano
(74) *Attorney, Agent, or Firm* — McClure, Qualey & Rodack, LLP

(57) ABSTRACT

A data processing method includes the following steps. First image files are obtained. The first image files are screened to generate second image files according to a predetermined condition. Each second image file is scanned to obtain the file messages of each second image file. An image of each second image file is analyzed to obtain a bone mineral density reference value corresponding to each image. A T-score reference value and a Z-score reference value corresponding to each second image file are calculated according to the file messages and the bone mineral density reference values. Bone mineral density determination results are generated according to the T-score reference values and a first predetermined value or the Z-score reference values and a second predetermined value. An output result is generated according to the file messages, the T-score reference values, the Z-score reference values and the bone mineral density determination results.

8 Claims, 3 Drawing Sheets

(58) Field of Classification Search
CPC ...... G16H 50/30; G06V 10/40; A61B 6/5217; A61B 6/505
See application file for complete search history.

(56) References Cited

U.S. PATENT DOCUMENTS

| | | | | |
|---|---|---|---|---|
| 10,039,513 | B2 | 8/2018 | Bregman-Amitai et al. | |
| 2005/0031181 | A1* | 2/2005 | Bi | G16H 50/20 382/132 |
| 2009/0103789 | A1* | 4/2009 | Danner | G16H 30/20 382/128 |
| 2010/0069334 | A1 | 3/2010 | Cadaval | |
| 2012/0221310 | A1* | 8/2012 | Sarrafzadeh | A61B 5/7275 703/11 |
| 2013/0184556 | A1* | 7/2013 | Kalvesten | G06T 7/0014 600/407 |
| 2014/0081146 | A1* | 3/2014 | Keim | A61B 5/0077 600/407 |
| 2016/0015347 | A1* | 1/2016 | Bregman-Amitai | G06T 7/0012 382/131 |
| 2020/0214657 | A1* | 7/2020 | Notohara | G01T 1/02 |
| 2021/0027353 | A1* | 1/2021 | Asbury | G06Q 30/0241 |
| 2022/0335722 | A1* | 10/2022 | Xue | G06V 10/82 |
| 2023/0169655 | A1 | 6/2023 | Bianco et al. | |
| 2024/0120095 | A1* | 4/2024 | Naghavi | G16H 50/30 |

FOREIGN PATENT DOCUMENTS

| | | | | |
|---|---|---|---|---|
| CN | 115376645 | A | | 11/2022 |
| TW | M609263 | U | | 3/2021 |
| TW | 202131863 | A | * | 9/2021 |

OTHER PUBLICATIONS

Chinese language office action dated Apr. 21, 2025, issued in application TW 112146782.
Written Opinion and Search Report dated Jan. 9, 2026 in Singapore application No. 10202401190P.
Invitation to Respond to Written Opinion and Search Report dated Jan. 16, 2026 in Singapore application No. 10202401190P.

* cited by examiner

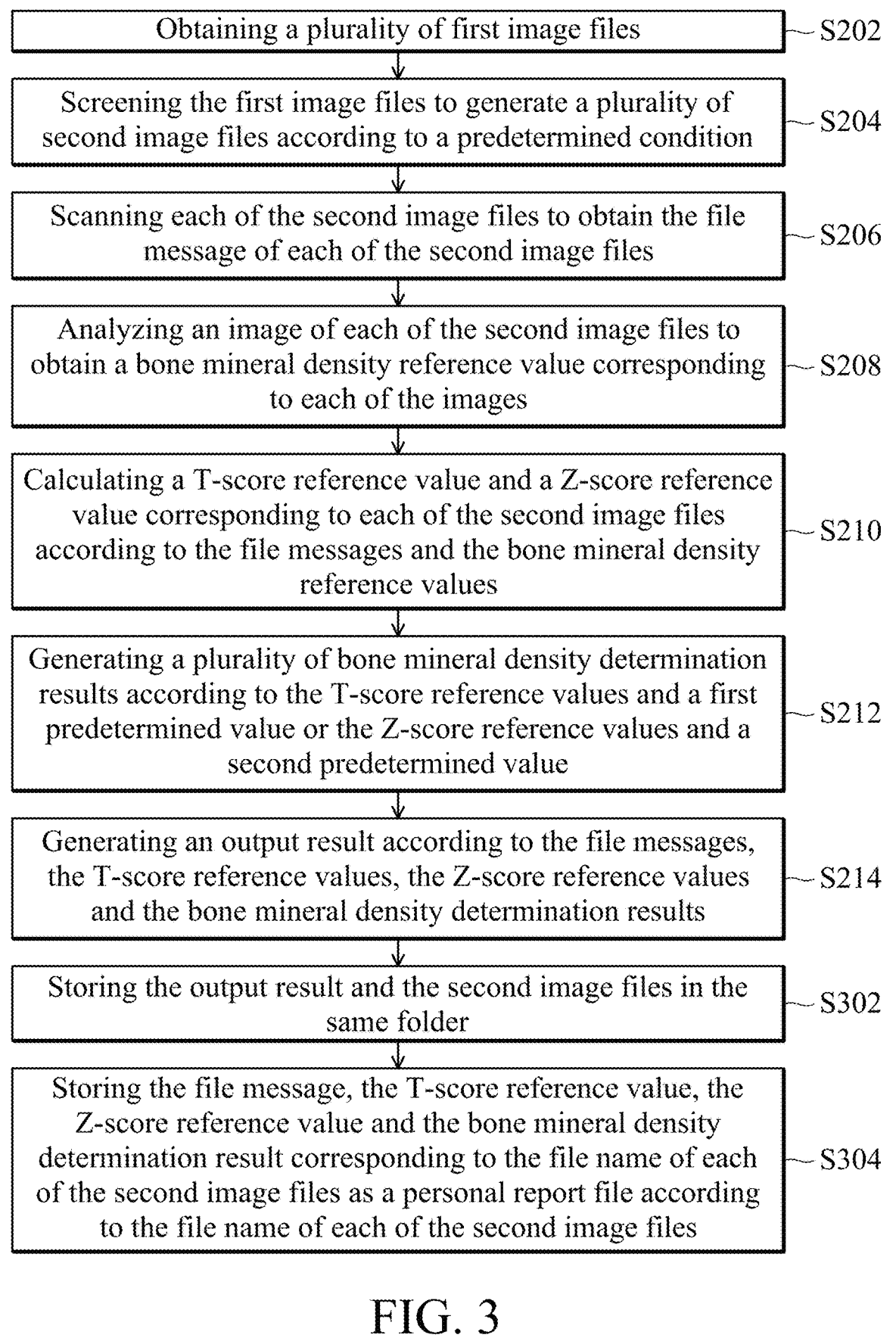

Obtaining a plurality of first image files — S202

Screening the first image files to generate a plurality of second image files according to a predetermined condition — S204

Scanning each of the second image files to obtain the file message of each of the second image files — S206

Analyzing an image of each of the second image files to obtain a bone mineral density reference value corresponding to each of the images — S208

Calculating a T-score reference value and a Z-score reference value corresponding to each of the second image files according to the file messages and the bone mineral density reference values — S210

Generating a plurality of bone mineral density determination results according to the T-score reference values and a first predetermined value or the Z-score reference values and a second predetermined value — S212

Generating an output result according to the file messages, the T-score reference values, the Z-score reference values and the bone mineral density determination results — S214

Storing the output result and the second image files in the same folder — S302

Storing the file message, the T-score reference value, the Z-score reference value and the bone mineral density determination result corresponding to the file name of each of the second image files as a personal report file according to the file name of each of the second image files — S304

FIG. 3

DATA PROCESSING METHOD AND DEVICE

CROSS REFERENCE TO RELATED APPLICATIONS

This application claims priority of Taiwan Patent Application No. 112146782, filed on Dec. 1, 2023, the entirety of which is incorporated by reference herein.

BACKGROUND OF THE INVENTION

Field of the Invention

The present invention relates to a processing method and device, and in particular it relates to a data processing method and device.

Description of the Related Art

In general, osteoporosis does not cause obvious symptoms, but osteoporosis may cause fragile bones and increase the risk of fractures. Patients may suffer fractures due to minor trauma, which may further cause many symptoms, functional impairment, or even death. Therefore, prevention and screening for osteoporosis have become important medical and public health issues. Currently, the chest X-ray health examination is a very common form of medical examination, and is very accessible to the general public. The chest X-ray health examination may directly photograph the sternum and spine, which makes it convenient for bone mineral density testing. However, when a chest X-ray is used in a health examination institution, there are usually a large number of people undergoing health exams, and this may generate a huge amount of data, affecting the data-processing efficiency of large-scale bone mineral density screenings. Therefore, how to increase the data processing efficiency of large-scale bone mineral density screenings is an area of focus for technical improvements by various manufacturers.

BRIEF SUMMARY OF THE INVENTION

An embodiment of the present invention provides a data processing method and device, thereby increasing the data processing efficiency of large-scale bone mineral density screening and increasing the convenience of use.

An embodiment of the present invention provides a data processing method, which includes the follow steps. A plurality of first image files are obtained. The first image files are screened to generate a plurality of second image files according to a predetermined condition. Each of the second image files is scanned to obtain the file message of each of the second image files. An image of each of the second image files is analyzed to obtain a bone mineral density reference value corresponding to each of the images. A T-score reference value and a Z-score reference value corresponding to each of the second image files are calculated according to the file messages and the bone mineral density reference values. A plurality of bone mineral density determination results are generated according to the T-score reference values and a first predetermined value or the Z-score reference values and a second predetermined value. An output result is generated according to the file messages, the T-score reference values, the Z-score reference values and the bone mineral density determination results.

An embodiment of the present invention provides a data processing device, which includes a storage module and a processing module. The storage module is configured to store a plurality of first image files. The processing module is coupled to the storage module. The processing module is configured to obtain a plurality of first image files. The processing unit is configured to screen the first image files to generate a plurality of second image files according to a predetermined condition. The processing module is configured to scan each of the second image files to obtain the file message of each of the second image files. The processing module is configured to analyze an image of each of the second image files to obtain a bone mineral density reference value corresponding to each of the images. The processing module is configured to calculate a T-score reference value and a Z-score reference value corresponding to each of the second image files according to the file messages and the bone mineral density reference values. The processing module is configured to generate a plurality of bone mineral density determination results according to the T-score reference values and a first predetermined value or the Z-score reference values and a second predetermined value. The processing module is configured to generate an output result according to the file messages, the T-score reference values, the Z-score reference values and the bone mineral density determination results.

According to the data processing method and device disclosed by the present invention, the plurality of first image files are obtained. The first image files are screened to generate the plurality of second image files according to the predetermined condition. Each of the second image files is scanned to obtain the file message of each of the second image files. The image of each of the second image files is analyzed to obtain the bone mineral density reference value corresponding to each of the images. The T-score reference value and the Z-score reference value corresponding to each of the second image files are calculated according to the file messages and the bone mineral density reference values. The plurality of bone mineral density determination results are generated according to the T-score reference values and the first predetermined value or the Z-score reference values and the second predetermined value. The output result is generated according to the file messages, the T-score reference values, the Z-score reference values and the bone mineral density determination results. Therefore, it may effectively increase the data processing efficiency of large-scale bone mineral density screening and increase the convenience of use.

BRIEF DESCRIPTION OF THE DRAWINGS

The present invention can be more fully understood by reading the subsequent detailed description and examples with references made to the accompanying drawings, wherein:

FIG. 3 is a flowchart of a data processing method according another embodiment of the present invention.

DETAILED DESCRIPTION OF THE INVENTION

It should be understood that the terms such as "including" and "comprising" used in the specification are used to indicate the existence of specific technical features, numerical values, method steps, working processes, elements and/ or components, but do not exclude the possibility of adding further technical features, numerical values, method steps, working processes, elements, components, or any combination of the above.

Terms such as "first" and "second" are used to modify components, and they are not used to indicate the priority or precedence relationship between them, but are only used to distinguish components with the same name.

In each of the following embodiments, the same reference number represents an element or component that is the same or similar.

Figure 1:
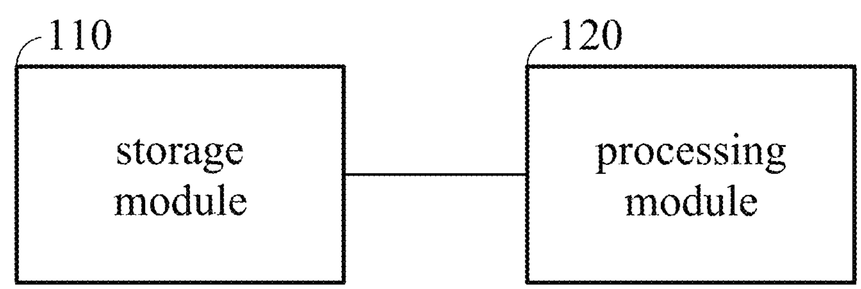
FIG. 1 is a schematic view of a data processing device according an embodiment of the present invention.

FIG. 1 is a schematic view of a data processing device according an embodiment of the present invention. Please refer to FIG. 1. The data processing device 100 includes a storage module 110 and a processing module 120.

The storage module 110 may store a plurality of first image files. In some embodiments, the storage module 110 may, for example, be a random access memory (RAM), a read-only memory (ROM), a flash memory, a hard disk drive (HDD), a solid state drive (SSD) or similar component or a combination thereof, but the embodiment of the present invention is not limited thereto.

The processing module 120 is coupled to the storage module 110. In the embodiment, the processing module 120 may include a central processing unit (CPU), a microprocessor, a micro control unit (MCU), a digital signal processor (DSP), a programmable logic controller (PLC), a field programmable gate array (FPGA) or a suitable processor, but the embodiment of the present invention is not limited thereto.

The processing module 120 may obtain the first image files. That is, the processing module 120 may access the storage module 110 to obtain the first image files stored in the storage module 110.

Then, the processing module 120 may screen the first image files to generate a plurality of second image files according to a predetermined condition. In some embodiments, the predetermined condition may include a predetermined file format, wherein the predetermined file format may, for example, be a digital imaging and communications in medicine (DICOM) format, but the embodiment of the present invention is not limited thereto. That is, the processing module 120 may compare the file format of the first image file with the predetermined file format (such as the DICOM format) to determine whether the file format of the first image file matches the predetermined file format (such the DICOM format), so as to determine whether the file format of the first image file is correct and used as a basis for generating the second image file.

When the processing module 120 determines that the file format of the first image file matches the predetermined file format (such as the DICOM format), the processing module 120 may determine that the file format of the first image file is correct, and the processing module 120 may output the first image file as the second image file. In addition, when the processing module 120 determines that the file format of the first image file does not match the predetermined file format (such as the DICOM format), the processing module 120 may determine that the first image file is not correct, and the processing module 120 may not output the first image file as the second image file and exclude the first image file.

In some embodiments, the predetermined condition may include a predetermined image resolution, wherein the predetermined image resolution may, for example, be 1024*1024, but the embodiment of the present invention is not limited thereto. That is, the processing module 120 may compare the image resolution of the image of the first image file with the predetermined image resolution (such as 1024*1024) to determine whether the image resolution of the image of the first image file is less than the predetermined image resolution, and then determine whether the image resolution of the image of the first image file is sufficient and used as a basis for generating the second image file.

When the processing module 120 determines that the image resolution of the image of the first image file is greater than or equal to the predetermine image resolution (such as 1024*1024), the processing module 120 may determine that the image resolution of the image of the first image file is sufficient, and the processing module 120 may output the first image file as the second image file. In addition, when the processing module 120 determines that the image resolution of the image of the first image file is less than the predetermined image resolution (such as 1024*1024), the processing module 120 may determine that the image resolution of the image of the first image file is not sufficient, and the processing module 120 may not output the first image file as the second image file and exclude the first image file.

Afterward, the processing module 120 may scan each of the second image files to obtain the file message of each of the second image files. Furthermore, the processing module 120 may scan each of the second image file to obtain a tag in the second image file, and obtain the file message corresponding to the tag according to the tag of the second image file. In the embodiment, the above file message may include date of birth, gender, date of shooting, and ethnicity, but the embodiment of the present invention is not limited thereto.

Then, the processing module 120 may analyze an image of each of the second image files to obtain a bone mineral density reference value corresponding to each of the images. Furthermore, the processing module 120 may obtain the corresponding image from each of the second image files. Then, the processing module 120 may sequentially input these images into an artificial intelligence model (AI model) for analysis to obtain a bone mineral density (BMD) reference value corresponding to each image.

In the embodiment, the image of the above second image file (the first image file) may, for example, be an X-ray image. That is, the user may, in advance, perform an image capturing on the target object through an X-ray machine to obtain an image corresponding to the target object, and store the image in the second image file (first image file) of the storage module 110. In addition, the above target object may, for example, be a human body, but the embodiment of the present invention is not limited thereto. Furthermore, the above image may be an image of the digital imaging and communications in medicine (DICOM) format and correspond to the lumbar vertebrae L1~L5, but the embodiment of the present invention is not limited thereto. In addition, in the embodiment, the above artificial intelligence model may include a convolutional neural networks (CNN), but the embodiment of the present invention is not limited thereto.

Then, the processing module 120 may calculate a T-score reference value and a Z-score reference value corresponding to each of the second image files according to the file messages and the bone mineral density reference values. In the embodiment, the processing module 120 may compare and calculate the above bone mineral density reference values with the statistical data (i.e., bone mineral density) of the 20~29-year-old group to generate the T-score reference value corresponding to each of the second image files. In addition, the processing module 120 may calculate the above bone mineral density reference values according to the age (obtained from the date of shooting—the date of birth), gender and ethnicity in the file messages to generate the Z-score reference value corresponding to each of the second image files. That is, the Z-score reference value is to compare the average values of people of the same age and gender, calculate the number of standard deviations of the difference and express it as a numerical value.

Furthermore, the processing module 120 may present the output result in a table. In the embodiment, the above table may be a CSV file, a plain text file, or an Excel form, but the embodiment of the present invention is not limited thereto. In addition, the above output result may be shown in Table 1.

TABLE 1

| File name | name | date of birth | gender | ethnicity | date of shooting | age | BMD | T-score | Z-score | bone mineral density determination result |
|---|---|---|---|---|---|---|---|---|---|---|
| 00007713 | A | Oct. 24, 1964 | male | Asian | Oct. 24, 2020 | 56 | 0.93991 | −2 | −0.9 | no significant abnormality found |
| 00008698 | B | Apr. 24, 1956 | male | Asian | Apr. 24, 2018 | 62 | 0.94286 | −1.9 | −0.7 | no significant abnormality found |
| 00016240 | C | Jun. 16, 1948 | female | Asian | Jun. 16, 2000 | 52 | 1.00679 | −1.4 | −0.1 | no significant abnormality found |
| 00019078 | D | Jul. 2, 1945 | female | Asian | Jul. 2, 2001 | 56 | 0.86705 | −2.6 | −.09 | risk of bone mineral abnormality |

Afterward, the processing module 120 may generate a plurality of bone mineral density determination results according to the T-score reference values and a first predetermined value or the Z-score reference values and a second predetermined value. In the embodiment, the first predetermined value may, for example, be −2.5, and the second predetermined value may, for example, be −2, but the embodiment of the present invention is not limited thereto. Furthermore, the processing module 120 may compare the T-score reference values with the first predetermined value or compare the Z-score reference values with the second predetermined value to determine whether the T-score reference values are less than or equal to the first predetermined value or the Z-score reference values are less than or equal to the second predetermined value, and then determine whether the second image files have a risk of bone mineral abnormality and generate the corresponding bone mineral density determination results.

For example, when the processing module 120 determines that the T-score reference value is less than or equal to the first predetermined value or the Z-score reference values is less than or equal to the second predetermined value, the processing module 120 may determine the second image file has the risk of bone mineral abnormality and generate the bone mineral density determination result corresponding to "risk of bone mineral abnormality". In addition, when the processing module 120 determines that the T-score reference value is not less than or equal to the first predetermined value or the Z-score reference value is not less than or equal to the second predetermined value, the processing module 120 may determine that the second image file does not have the risk of bone mineral abnormality and generate the bone mineral density determination result corresponding to "no significant abnormality found".

Then, the processing module 120 may generate an output result according to the above file messages, the above T-score reference values, the above Z-score reference values and the above bone mineral density determination results.

In some embodiments, the processing module 120 may further store the output result and the second image files in the same folder. In addition, the processing module 120 may further store the file message, the T-score reference value, the Z-score reference value and the bone mineral density determination result corresponding to the file name of each of the second image files as a personal report file according to the file name of each of the second image files. For example, the processing module 120 may obtain the file message (date of birth (Oct. 24, 1964), the gender (male), the date of shooting (Oct. 24, 2020), the ethnicity (Asian), the T-score reference value (−2), the Z-score reference value (−0.9) and the bone mineral density determination result (no significant abnormality found) related to the file name (such as 00007713) of the second image file from the output result according to the file name (such as 00007713) of the second image file, and store the above contents in the form of a personal report file. The manner of storing the rest of the personal report files may be deduced by analogy. In addition, the personal report file includes the above information and may further include the name, date of birth, age, etc. Therefore, it may effectively increase the data processing efficiency of large-scale bone mineral density screening and increase the convenience of use.

Figure 2:
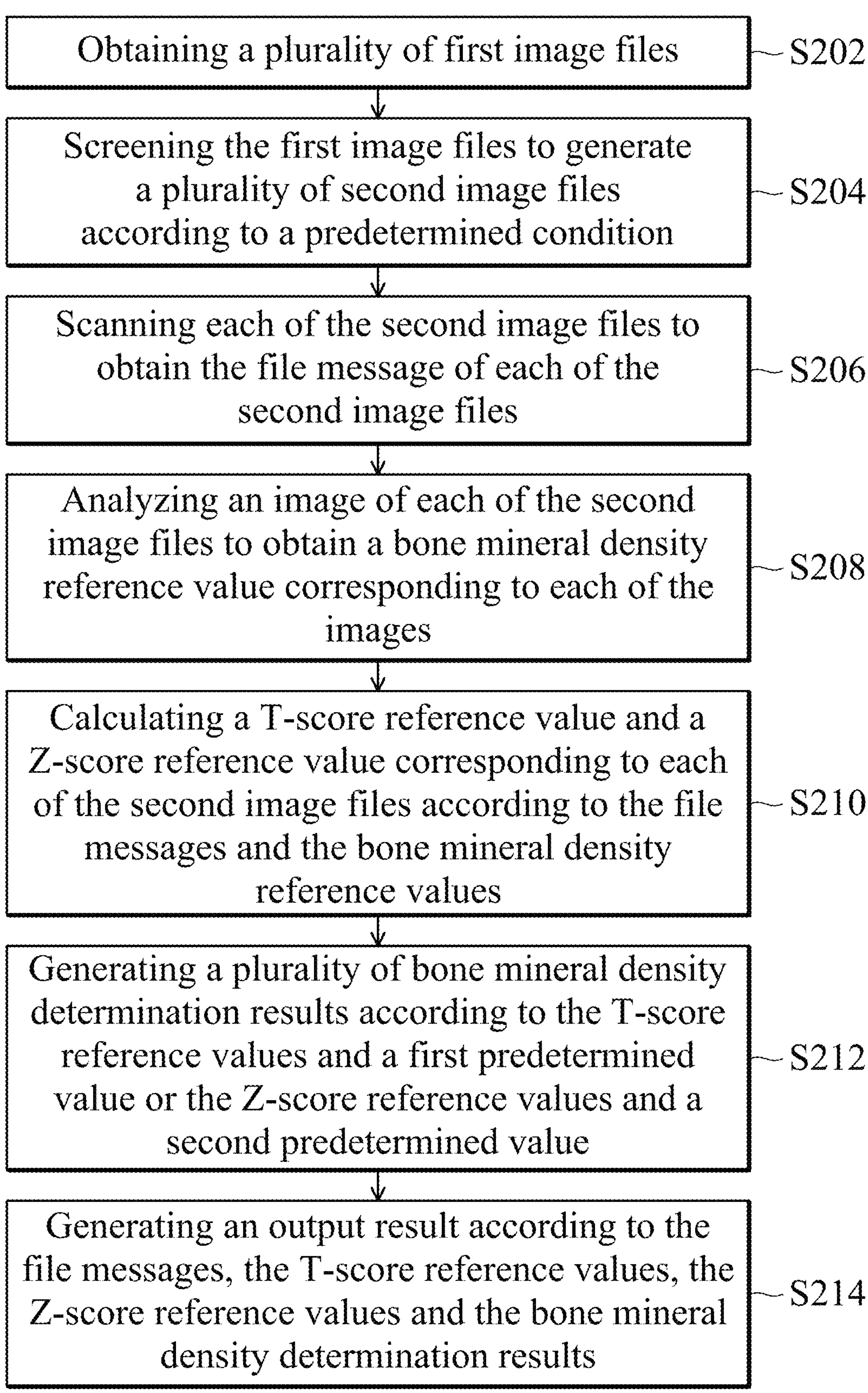
FIG. 2 is a flowchart of a data processing method according an embodiment of the present invention.

FIG. 2 is a flowchart of a data processing method according an embodiment of the present invention. In step S202, the method involves obtaining a plurality of first image files. In step S204, the method involves screening the first image files to generate a plurality of second image files according to a predetermined condition. In step S206, the method involves scanning each of the second image files to obtain the file message of each of the second image files. In step S208, the method involves analyzing an image of each of the second image files to obtain a bone mineral density reference value corresponding to each of the images.

In step S210, the method involves calculating a T-score reference value and a Z-score reference value corresponding to each of the second image files according to the file messages and the bone mineral density reference values. In step S212, the method involves generating a plurality of bone mineral density determination results according to the T-score reference values and a first predetermined value or the Z-score reference values and a second predetermined value. In step S214, the method involves generating an output result according to the file messages, the T-score reference values, the Z-score reference values and the bone mineral density determination results. In the embodiment, the above predetermined condition includes, for example, a predetermined file format or a predetermined image resolution. In addition, the above file message includes, for example, date of birth, gender, date of shooting, and ethnicity. Furthermore, the above output result is presented, for example, in a table.

FIG. 3 is a flowchart of a data processing method according another embodiment of the present invention. In the embodiment, steps S202~S214 in FIG. 3 are the same as or similar to steps S202~S214 in FIG. 2. Accordingly, steps S202~S214 in FIG. 3 may refer to the description of the embodiment of FIG. 2, and the description thereof is not repeated herein. In step S302, the method involves storing the output result and the second image files in the same folder. In step S304, the method involves storing the file message, the T-score reference value, the Z-score reference value and the bone mineral density determination result corresponding to the file name of each of the second image files as a personal report file according to the file name of each of the second image files.

In summary, according to the data processing method and device disclosed by the embodiment of the present invention, the plurality of first image files are obtained. The first image files are screened to generate the plurality of second image files according to the predetermined condition. Each of the second image files is scanned to obtain the file message of each of the second image files. The image of each of the second image files is analyzed to obtain the bone mineral density reference value corresponding to each of the images. The T-score reference value and the Z-score reference value corresponding to each of the second image files are calculated according to the file messages and the bone mineral density reference values. The plurality of bone mineral density determination results are generated according to the T-score reference values and the first predetermined value or the Z-score reference values and the second predetermined value. The output result is generated according to the file messages, the T-score reference values, the Z-score reference values and the bone mineral density determination results. In addition, the embodiment may further store the output result and the second image files in the same folder, and store the file message, the T-score reference value, the Z-score reference value and the bone mineral density determination result corresponding to the file name of each of the second image files as a personal report file according to the file name of each of the second image files. Therefore, it may effectively increase the data processing efficiency of large-scale bone mineral density screening and increase the convenience of use.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A data processing method, comprising:

obtaining a plurality of first image files;

screening the first image files to generate a plurality of second image files according to a predetermined condition, wherein the predetermined condition comprises a predetermined file format and a predetermined image resolution;

wherein the predetermined resolution is pixel dimensions;

scanning each of the second image files to obtain a tag of each of the second image files, and obtaining a file message of each of the second image files corresponding to the tag according to the tag of each of the second image files;

analyzing an image of each of the second image files to obtain a bone mineral density reference value corresponding to each of the images;

calculating a T-score reference value and a Z-score reference value corresponding to each of the second image files according to the file messages and the bone mineral density reference values;

generating a plurality of bone mineral density determination results according to the T-score reference values and a first predetermined value or the Z-score reference values and a second predetermined value; and generating an output result according to the file messages, the T-score reference values, the Z-score reference values and the bone mineral density determination results;

wherein screening the first image files to generate the second image files according to the predetermined condition comprises:

comparing a file format of each of the first image files with the predetermined file format, and comparing an image resolution of an image of each of the first image files with the predetermined image resolution;

when it is determined that the file format of each of the first image files matches the predetermined file format and when it is determined that the image resolution of the image of each of the first image files is greater than or equal to the predetermined image resolution, outputting the first image files as the second image files to generate the second image files; and when it is determined that the file format of each of the first image files does not match the predetermined file format and when it is determined that the image resolution of the image of each of the first image files is less than the predetermined image resolution, not outputting the first image files as the second image files and excluding the first image files.

2. The data processing method as claimed in claim 1, wherein the file message comprises date of birth, gender, date of shooting, and ethnicity.

3. The data processing method as claimed in claim 1, wherein the output result is presented in a table.

4. The data processing method as claimed in claim 1, further comprising:

storing the output result and the second image files in a same folder; and storing the file message, the T-score reference value, the Z-score reference value and the bone mineral density determination result corresponding to a file name of each of the second image files as a personal report file according to the file name of each of the second image files.

5. A data processing device, comprising:

a storage module, configured to store a plurality of first image files; and a processing module, coupled to the storage module, wherein the processing module is configured to obtain the plurality of first image files, the processing unit is configured to screen the first image files to generate a plurality of second image files according to a predetermined condition, wherein the predetermined condition comprises a predetermined file format and a predetermined image resolution, wherein the predetermined resolution is pixel dimensions;

the processing module is configured to scan each of the second image files to obtain a of each of the second image files, and obtain a file message of each of the second image files corresponding to the tag according to the tag of each of the second image files, the processing module is configured to analyze an image of each of the second image files to obtain a bone mineral density reference value corresponding to each of the images, the processing module is configured to calculate a T-score reference value and a Z-score reference value corresponding to each of the second image files according to the file messages and the bone mineral density reference values, the processing module is configured to generate a plurality of bone mineral density determination results according to the T-score reference values and a first predetermined value or the Z-score reference values and a second predetermined value, and the processing module is configured to generate an output result according to the file messages, the T-score reference values, the Z-score reference values and the bone mineral density determination results;

wherein the processing module is further configured to compare a file format of each of the first image files with the predetermined file format, or compare an image resolution of an image of each of the first image files with the predetermined image resolution;

wherein when the processing module compares a file format of each of the first image files with the predetermined file format, and compares an image resolution of an image of each of the first image files with the predetermined image resolution;

when the processing module determines that the file format of each of the first image files matches the predetermined file format, and when it is determined that the image resolution of the image of each of the first image files is greater than or equal to the predetermined image resolution, the processing module outputs the first image files as the second image files to generate the second image files; and when the processing module determines that the file format of each of the first image files does not match the predetermined file format, and when it is determined that the image resolution of the image of each of the first image files is less than the predetermined image resolution, the processing module does not output the first image files as the second image files and excludes the first image files.

6. The data processing device as claimed in claim 5, wherein the file message comprises date of birth, gender, date of shooting, and ethnicity.

7. The data processing device as claimed in claim 5, wherein the output result is presented in a table.

8. The data processing device as claimed in claim 5, wherein the processing module is further configured to store the output result and the second image files in a same folder, and the processing module is configured to store the file message, the T-score reference value, the Z-score reference value and the bone mineral density determination result corresponding to a file name of each of the second image files as a personal report file according to the file name of each of the second image files.

* * * * *